3,396,201
ADDUCTS OF HEXAHALOCYCLOPENTADIENE WITH ALKADIENES
Edward D. Weil, Yonkers, N.Y., and John F. Porter, Durham, N.C., assignors to Hooker Chemical Corporation, Niagara Falls, N.Y., a corporation of New York
No Drawing. Continuation-in-part of application Ser. No. 597,853, Nov. 30, 1966. This application Nov. 22, 1967, Ser. No. 684,972
6 Claims. (Cl. 260—648)

ABSTRACT OF THE DISCLOSURE

The mono- and di-Diels-Alder adducts of hexahalocyclopentadiene with terminally double bonded alkadienes having 8 to 20 carbon atoms, are claimed as new compositions. They are useful as pesticides and fire retardant additives in polymers.

---

This is a continuation-in-part of Ser. No. 345,066, filed Feb. 17, 1964, now abandoned, and Ser. No. 597,853, filed Nov. 30, 1966, now abandoned.

In accordance with the present invention, the novel halogenated bicyclic hydrocarbons, which are prepared by the Diels-Alder reaction of hexahalocyclopentadiene and appropriate terminally unsaturated alkadienes, as will be more fully described hereinafter, are represented by the following formulas:

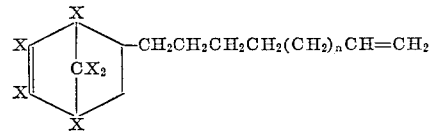

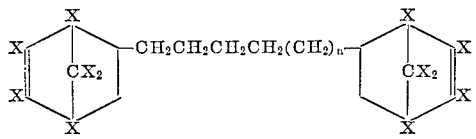

wherein X is a halogen atom such as chlorine, bromine, or fluorine, said halogen atoms being the same or different, and $n$ is a number from zero to about 12.

Among the compounds within the present invention are the 1:1 and 1:2 adducts of 1,7-octadiene and longer chain terminal diolefins containing from 8 to about 20 carbon atoms and preferably from 8 to about 16 carbon atoms, such as 1,9-decadiene, 1,11-dodecadiene, 1,15-hexadecadiene and 1,19-eicosadiene (hereinafter called $\alpha,\alpha$-alkadienes) with hexachlorocyclopentadiene, hexabromocyclopentadiene, bromopentachlorocyclopentadiene, dibromotetrachlorocyclopentadiene, tribromotrichlorocyclopentadiene, tetrabromodifluorocyclopentadiene, and pentabromochlorocyclopentadiene, and the like. The preferred species for reasons of ease of manufacture and activity are the 1:1 and 2:1 adducts of hexachlorocyclopentadiene with 1,7-octadiene.

Illustrative examples of some of the compounds embraced herein thus include those as represented by the following formulas, but the invention is not intended to be limited thereto.

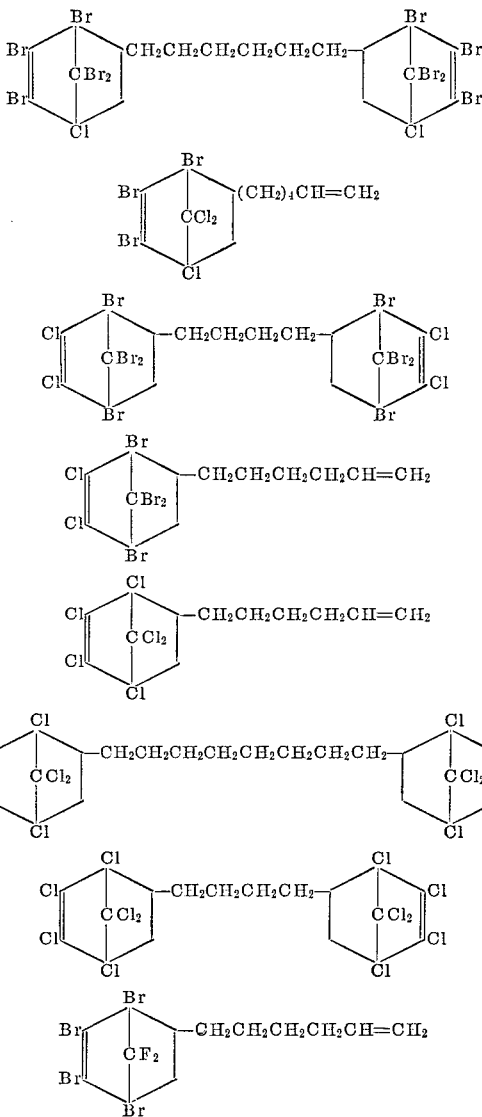

The 1:1 adducts and 2:1 adducts are prepared by the Diels-Alder reaction of hexahalocyclopentadiene, wherein the halogen atoms have an atomic weight between 34 and 81 with the appropriate diene, it being understood that the Diels-Alder diene synthesis comprises the 1,4 addition to a diene of an olefinic double bond.

The reaction is accomplished by heating together hexahalocyclopentadiene and the $\alpha,\alpha'$-alkadiene at a temperature from about 40 degrees centigrade to 250 degrees centigrade, and preferably at a temperature from 60 degrees centigrade to 200 degrees centigrade in the liquid phase, for a period of time ranging from 10 minutes near the higher temperature to about 10 days or more at the lower temperatures, the time being determined at any temperature by observing the exact conversion using distillation analysis, gas chromatography, infrared spectrum, change of refractive index, or any other convenient means to measure conversion.

The molar ratio of hexahalocyclopentadiene to $\alpha,\alpha'$-alkadiene will depend upon the product desired. Thus, if the 1:1 adduct is desired, one mole of hexahalocyclopentadiene to one mole or more of $\alpha,\alpha'$-alkadiene are utilized, while if the 2:1 adduct is desired, two moles or more of hexahalocyclopentadiene to one mole of $\alpha,\alpha'$-alkadiene are generally employed. At most ratios, at least some of each adduct is formed.

The 1:1 adducts, which are generally liquid, are best isolated and purified by distillation although other methods known in this art can be utilized. The 1:2 adducts, which are generally crystalline solids, are conveniently filtered out and, if desired, recrystallized. Further, both products can be made simultaneously, if desired, and are easily separated by separation methods known in this art, such as distillation, filtration or a combination of these methods.

The novel compounds of the present invention have utility as pesticides and flame retardant additives to polymers. The 1:1 adduct is preferably utilized as the pesticide while the 1:2 adduct possesses flame retardant properties when incorporated into resins. Specifically, the 1:2 adducts exemplified by the 1:2 Diels-Alder product of hexachlorocyclopentadiene with 1,7-octadiene possess remarkable flame retardant properties when incorporated into resins, as will be more fully illustrated in the working examples. They also possess unusual solubility in solvents, exhibit unexpected ability to be dispensed in polymers without substantial loss of other properties to the polymer, and yet have stability with respect to immigration from the polymer.

For flame-retardant purposes, the compositions comprising the novel compositions of the present invention can be admixed into the polymer by one of several methods known in this art. For example, the additives can be introduced into the polymer while the latter is dissolved in a suitable solvent. This procedure is especially useful when it is desired to mix the additives during the polymer manufacturing process. When the polymer is subsequently recovered from the solvent, the additives are intermittently mixed with the polymer. Usually, the additives are mixed with the polymer in the molten state at temperatures that can range from the melting point to a temperature just below the decomposition temperature of the polymer. Alternatively, the additives and polymer are dry blended in the finely divided state so that intimate mixture is obtained upon subsequent molding or extrusion.

Among the polymers in which the compounds of this invention are useful are the homopolymers and copolymers of unsaturated alphatic, cycloaliphatic and aromatic hydrocarbons, such as polyethylene, polypropylene, polybutene, ethylene propylene copolymers, copolymers of ethylene or propylene with other olefins, polybutadiene, polymers of butadiene, polyisoprene, natural or synthetic, polystyrene, polyvinylidene, and polymers of pentene, hexene, heptene, octene, 2-methylpropene-1,3-methylbutene-1,4 - methylpentene-1,4-methylhexene-1,5-methylhexene-1, bicyclohexene(2.2.1), pentadiene, hexadiene, 2,3-dimethylbutadiene - 1,3,2 - methylpentadiene, vinylcyclohexene such as 4-vinylcyclohexene, cyclopentadiene, methylstyrene, and the like. Other useful polymers include indene-coumarone resins, polymers of acrylate esters and polymers of methacrylate esters, acrylate and methacrylate resins such as ethyl acrylate, n-butyl methacrylate, isobutyl methacrylate, ethyl methacrylate, and methyl methacrylate, alkyd resins, hydrocarbon resins from petroleum, isobutylene resin (polyisobutylene), isocyanate resins (polyurethanes), polyester resins such as polyesters (unsaturated) of dibasic acids and dihydroxy compounds, polyester elastomers, polyisobutylene, rubbers such as natural rubber, synthetic polyisoprene, chlorinated rubber, polybutadiene, cyclized rubber, butadiene-acrylonitrile rubber, butadiene-styrene rubber, and butyl rubber, neoprene rubber (polychloroprene), styrene resins (polystyrene), terpene resins, urea resins, vinyl resins, such as vinyl acetal, vinyl acetate or vinyl alcohol-acetate, vinyl acetate copolymer, vinyl alcohol, vinyl alkyl ether, vinyl methyl ether-maleic anhydride copolymer, vinyl chloride, vinyl butyral, vinyl chlorideacetate copolymer, vinyl pyrrolidone, and vinylidene chloride copolymer and the like.

Other polymers also within the scope of this invention include nylon, diallyl phthalates and phthalate resins, and polycarbonates. Polycarbonate are thermoplastic resins formed from a dihydroxy compound and a carbonate diester. The more important commercial polycarbonates are made from para, para-isopropylidenediphenol and phosgene. Other resins within the scope of this invention include the condensation reaction products of phenol and aldehydes, e.g., novolacs and thermoplastic polymers of bis-(4-hydroxyphenyl)-2,2-propane and epichlorohydrin (tradename of Phenoxy).

The fire retardant compounds of the instant invention are desirably incorporated into polymer materials in the range from about 5 to about 50 percent by weight of the polymer composition, and preferably from about 10 to about 35 percent by weight. An antimony compound, such as antimony oxide, can be used in amounts ranging from less than one to about 30 percent by weight of the polymer composition and preferably from 5 to about 20 percent by weight of the polymer composition to further enhance flame retardant properties.

In their application as pesticides (especially as insecticides) the compounds of the invention, particularly the 1:1 adducts with hexahalocyclopentadiene are applied either pure of in a formulated state at effective or pesticidal rates to the loci of the pests to be controlled. Pesticidal rates generally will encompass 0.05 to 100 pounds per acre, the lower range being employed with the more sensitive species and where only short term control is needed, the higher range where resistant species are involved or where long duration is desired. The concentrations in which the active insecticide is applied will generally be in the range of from 0.001 to 100 percent. Suitable formulations comprise mixtures with solvents, diluents, solid carriers, and surfactants. Suitable solvents include petroleum hydrocarbons such as xylene, aromatic naphtha, and the like. Diluents include water (generally with an emulsifier). Solid carriers include clay, vermiculite, fertilizer, talc, wood flour and other mineral or cellulosic granules and powders. Suitable surfactants include the anionic type, exemplified by alkylarylsulfonates, the nonionic type, exemplified by polyethyleneoxide ethers of polyols or phenols and the cationic type, exemplified by long chain quaternary alkyl ammonium chlorides. Other formulation variations will be evident to one skilled in the pesticide art. Other adjuvants such as attractants, bait substances, and other pesticides may also be incorporated into the formulations.

The 1:1 adducts of the invention, having an unhindered olefinic double bond, can be polymerized and copolymerized, for example, with propylene and/or ethylene, using the catalysts known to the art for polymerizing propylene and ethylene. The polymers so produced have the advantage of possessing flame-retardant properties.

In the examples, specification and claims, parts are by weight and temperatures are in degrees centigrade, unless otherwise specified.

In order that those skilled in the art may better understand the present invention and the manner in which it may be practiced, the following illustrated examples are given.

Example 1.—Preparation of 1:1 and 2:1 adducts of hexachlorocyclopentadiene and octadiene - 1,7

A mixture of 273 parts by weight of hexachlorocyclopentadiene and 55 parts by weight of octadiene - 1,7 was heated on the steam bath for 2.5 days, then cooled to 25 degrees centigrade. The 2:1 adduct partly crystallized out and a sample was removed by filtration. The bulk of the reaction mixture was stripped under 0.1 mm. pressure to a pot temperature of 100 degrees, the distillate consisting of excess unreacted 1,7 - octadiene and a small amount of unreacted hexachlorocyclopentadiene. The residue was dissolved in 600 parts of hot benzene, and the solution was cooled and filtered. The crystalline solids thus removed amounted to 155 parts of colorless 2:1 adduct, of the formula

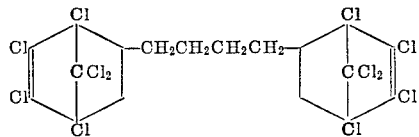

melting point 233 degrees centigrade. The infrared spectrum showed no —CH=CH₂ bands at 6.0–6.1μ.

*Analysis.*—Calculated for $C_{18}H_{14}Cl_{12}$: Cl 64.9%. Found: Cl 64.7%.

The mother liquor was stripped free of benzene and distilled to obtain 40 parts of the 1:1 adduct

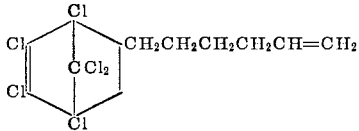

as a yellowish liquid distillate, boiling point 132–139 degrees (0.45 mm.). The infrared spectrum showed a CH=CH₂ group to be present.

*Analysis.*—Calculated for $C_{13}H_{14}Cl_6$: Cl 55.6%. Found: Cl 55.7%.

Example 2

In a manner similar to Example 1 other hexahalocyclopentadienes and α,α′ - alkadienes are reacted, as shown:

| Alkadiene (parts) | Hexahalocyclopentadiene | Temp. (° C.) | Time (hrs.) | Products |
|---|---|---|---|---|
| 1,7-octadiene (50) | 5,5-dibromo-1,2,3,4-tetrachlorocyclopentadiene (300). | 100 | 48 | (CH₂)₄CH=CH₂ adduct with CBr₂ ring, and 2:1 bis-adduct with (CH₂)₄ bridge |
| 1,9-decadiene (50) | Hexachlorocyclopentadiene (300). | 120 | 10 | (CH₂)₆CH=CH₂ adduct with CCl₂ ring, and 2:1 bis-adduct with (CH₂)₆ bridge |
| 1,11-dodecadiene (50) | do | 140 | 5 | (CH₂)₈CH=CH₂ adduct with CCl₂ ring, and 2:1 bis-adduct with (CH₂)₈ bridge |
| 1,19-eicosadiene (50) | Hexachlorocyclopentadiene (300). | 160 | 1 | (CH₂)₁₆CH=CH₂ adduct with CCl₂ ring, and 2:1 bis-adduct with (CH₂)₁₆ bridge |

Example 3.—Insecticidal activity of the 1:1 adduct of hexachlorocyclopentadiene and 1,7 - octadiene Adult houseflies (*Musca domestica*) were sprayed with an 0.1 percent aqueous dispersion of the 1:1 adduct of hexachlorocyclopentadiene and 1,7 - octadiene as produced in Example 1. The percentage fly knockdown after two hours was 100 percent and the percentage kill after 24 hours was 100 percent. Under similar conditions, the 1:1 adduct of hexachloropentadiene and butadiene gives a negligible kill.

The adduct of the 1,9 - decadiene with hexachlorocyclopentadiene is found to have similar activity, when tested against adult houseflies under similar conditions.

In Examples 4–6 the properties of the molded polymer compositions were tested in accordance with the standard American Society for Testing Material (ASTM) test procedures as follows:

Example 4.—Use of 2:1 adduct of hexachlorocyclopentadiene and 1,7-octadiene as flame retardant additive for a resin A composition containing 55 percent polypropylene, 30 percent of the 2:1 adduct of hexachlorocyclopentadiene and 1,7 - octadiene and 15 percent antimony oxide was blended in a ball mill overnight, extruded at 325 degrees Fahrenheit, chopped into prills, and injection molded at 350 degrees Fahrenheit into ⅛ x ½ x 5 inch bars. The material molded easily and the bars were pure white in color.

FLAME RETARDANCE TESTS

An ASTM D–635–56T test was run on two of the bars described in the above paragraph. The results (outlined below) indicate that the composition is usefully fire retardant.

| Bar No. | Burning Time (Seconds) After First Ignition | Burning Time After Second Ignition | Length Burned (Inches) |
|---|---|---|---|
| 1 | 2.2 | 3.4 | 1⅛ |
| 1 | 0.9 | 3.3 | 1¹¹⁄₁₆ |
| 2 | 4.2 | 3.5 | 1 |
| 2 | 1.9 | 1.0 | 1⁵⁄₁₆ |
| 2 | 1.3 | 1.0 | 1 |

The test samples did not drip during ignition or burning. A modified* fire retardance test, run on compression molded cylinders 9 millimeters in diameter, indicated that the presence of 25 percent of the 2:1 adduct of hexachlorocyclopentadiene and 1,7-octadiene also produces a very effective fire-retardant composition. Of course, lesser proportions of the adduct are also useful in reducing the flammability of resins and plastics. Test results are given below:

| | | |
|---|---|---|
| Percent Polypropylene | 55 | 62.5 |
| Percent 2:1 adduct of hexachlorocyclopentadiene and 1,7-octadiene | 30 | 25 |
| Percent antimony oxide | 15 | 12.5 |
| Burning times (seconds) | 4.4 | 13.2 |

Example 5.—Effect on mechanical properties of 2:1 hexachlorocyclopentadiene and 1,7-octadiene adduct Several mechanical property tests were run on injection-molded bars of a composition containing 55 percent polypropylene, 30 percent 1,7-octadiene hexachlorocyclopentadiene adduct and 15 percent antimony oxide. The results are shown in the next table. For comparison, data for pure polypropylene also are given. The heat distortion point of the mixture was found to be 11.5 degrees centigrade higher than that of pure polypropylene.

---
*A modified ASTM 635 test utilizing compression molding and a rod 9 millimeters in diameter.

| | Mixture | Pure Polypropylene |
|---|---|---|
| Heat distortion point at 66° C. (lbs. per sq. inch) | 122 | 110 |
| | | 111 |
| Average | | 110.5 |
| Shore D hardness | 75.6 | 73 |
| Flexural yield strength (lbs. per sq. inch) | 6,960 | 8,320 |
| Flex modulus (lbs. per sq. inch) | 3.22×10⁵ | |
| | 3.22×10⁵ | |
| | 2.91×10⁵ | |
| | 2.76×10⁵ | |
| | 2.96×10⁵ | |
| Average | 3.01×10⁵ | 2.77×10⁵ |

Example 6.—Comparison of heat aging behavior of resin containing 2:1 hexachlorocyclopetadiene 1,7-octadiene adduct The following compositions were intimately blended and then were molded into ⅛" x ½" x 5" test bars:

(1) 30% of the 2:1 C₅Cl₆/1,7-octadiene adduct, 15% Sb₂O₃, 55% polypropylene.

(2) 25% 2:1 C₅Cl₆/butadiene adduct, 12½% Sb₂O₃, 62½% polypropylene.

The bars were then heated at 120 degrees centigrade in an air-circulating oven and the percent weight loss determined at various intervals. The results were as follows:

| Composition | Weight Loss (percent) at Number of Days Indicated | | | |
|---|---|---|---|---|
| | 4 | 8 | 12 | 46 |
| (1) | 0.3 | 0.3 | 0.5 | 1.0 |
| (2) | 5.4 | 12.8 | 20.8 | |

The bars of composition (2) after a short time, developed a cracked spongy appearance, became brittle, and broke into small pieces at 12 days, causing their removal from the test.

The bars of composition (1) retained substantially their original appearance and properties.

When tested in accordance with the above procedures the hexabromocyclopentadiene 1,9-decadiene adduct is found to have similar properties.

While there have been described various embodiments of the invention, the methods and elements described are not intended to be understood as limiting the scope of the invention. It is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A compound selected from the group consisting of

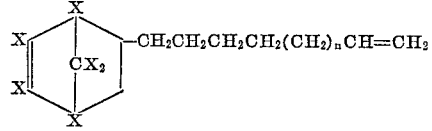

and

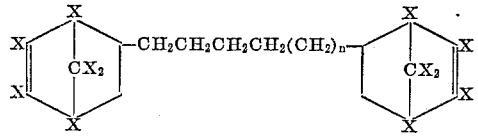

wherein X is a halogen atom selected from the group consisting of chlorine, bromine and fluorine and $n$ is from 0 to 12.

2. A compound selected from the group consisting of

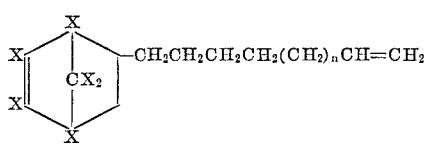

and

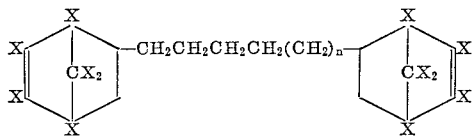

wherein X is a halogen atom selected from the group consisting of chlorine and bromine and *n* is from 0 to 12.

3. A compound of the formula

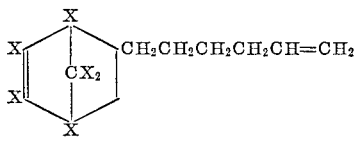

wherein X is a halogen atom selected from the group consisting of chlorine and bromine.

4. A compound of the formula

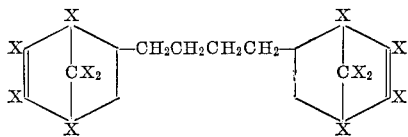

wherein X is a halogen atom selected from the group consisting of chlorine and bromine.

5. A compound of the formula

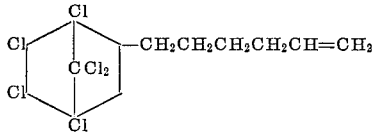

6. A compound of the formula

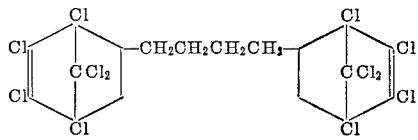

No references cited.

BERNARD HELFIN, *Primary Examiner.*

M. JACOB, *Assistant Examiner.*